United States Patent Office 3,608,151
Patented Sept. 28, 1971

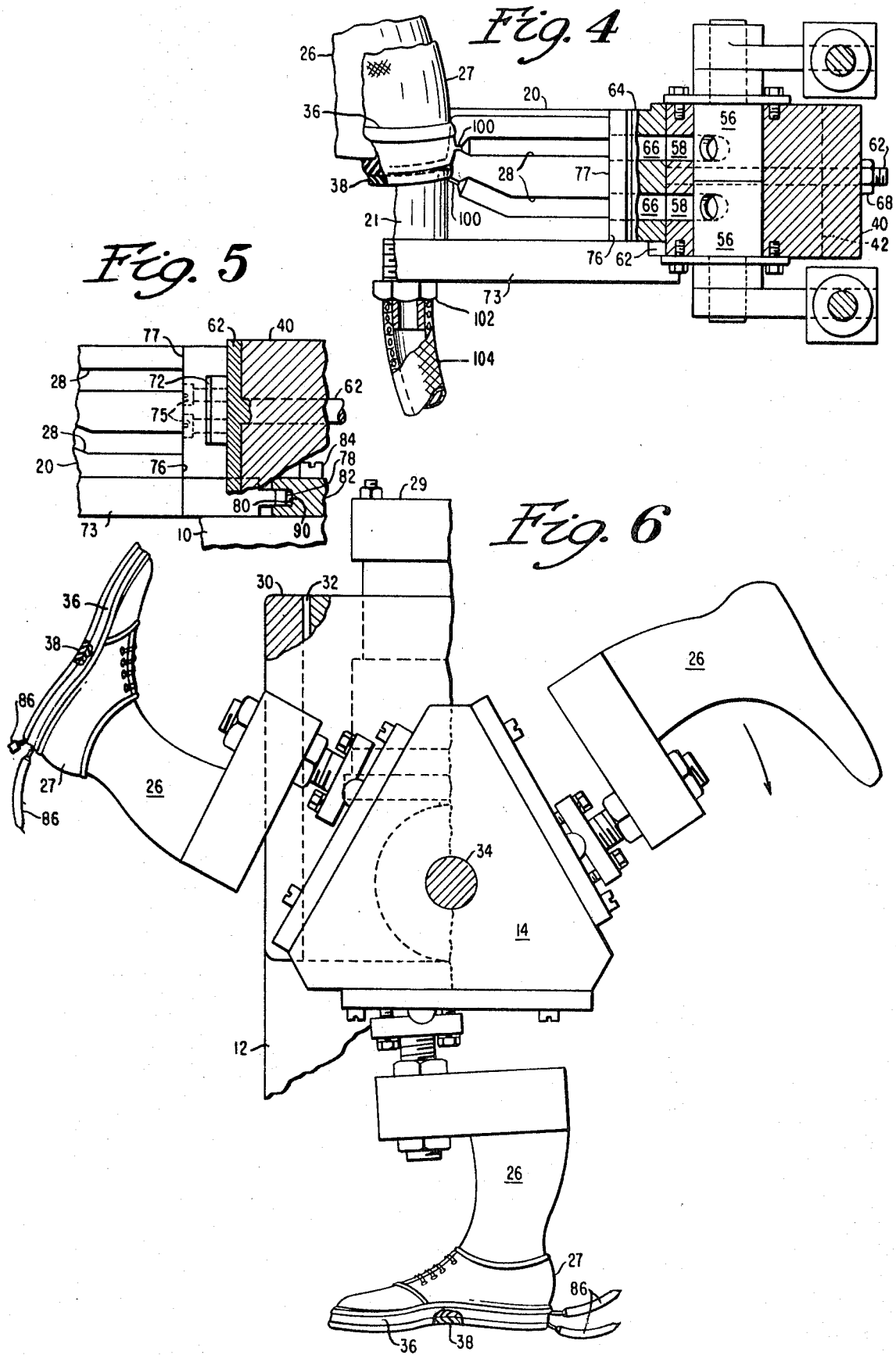

3,608,151
MOLD COUPLING FOR SOLE INJECTING
MACHINES
Oscar H. Cloutier, North Conway, N.H., and Ernest F.
Huber, Jr., Beverly, and Wallace W. Ingves, Reading,
Mass., assignors to New England Merchants National
Bank of Boston, Boston, Mass.
Original application June 12, 1968, Ser. No. 736,308.
Divided and this application July 28, 1969, Ser.
No. 845,199
Int. Cl. B29f 1/00
U.S. Cl. 18—30US
10 Claims

ABSTRACT OF THE DISCLOSURE

A shoe bottoming machine having a divided mold ring with interface grooves between its halves to form an injecting sprue, so arranged that a block on a plasticizing pump for forcing elastomer into the mold ring is releasably engaged to form a coupling with keys on the mold ring halves whenever they are brought together to form a molding cavity. The keys are supported on parts of a two-part carrier and the block is connected through a distributing manifold between the pump and the block in a manner to enable release of a sprue plug while attached to a molded shoe bottom from the mold ring when the mold ring parts are separated.

---

As hereinafter illustrated the machine of the invention is the same as that disclosed in an application for U.S. Letters Pat. Ser. No. 736,308, filed June 12, 1968 in the names of the present inventors, of which application the present one is a division.

The present invention relates to machines for injection molding bottoms and other parts of shoes, and more particularly to improvements in mold rings and means for quickly coupling and uncoupling them from a supply source of plasticized elastomer in such machines, so that reliable and effective operations are obtainable with high volume production to an extent not heretofore considered feasible.

With the introduction of polyvinyl chloride (PVC) and other modern thermoplastic elastomers it has been necessary to equip molding machines with sources of supply capable of safe control and flexible distribution to molds while the elastomers are heated to temperatures approaching 400° F. and under hydrostatic pressures of several hundred pounds per square inch.

One problem in adaptability of molds for the intended purpose arises from the fact that each mold employed is of necessity composed of a sole plate, a divided sole edge mold ring and a last for holding a shoe upper and for closing with the sole plate the ends of a cavity in the mold ring. When the sole is injected it adheres to the margins of the upper to complete a shoe. To release a completed shoe from the mold one half of the divided mold ring is separated from the other and the last carrying the shoe is withdrawn from between the separated mold ring halves. To enable injection of the mold the halves of the mold ring ordinarily have along their interface matching grooves which, when brought together, form an injection sprue.

After each molding operation is completed and the resulting molded shoe is withdrawn from a mold ring it has always been necessary heretofore to reach into a confined space between the mold ring halves with a manually held pair of long nose pliers in order to grasp and withdraw a solidified plug of elastomer from the opened up sprue, so that the mold ring may again be closed and the sprue will be ready to receive the next injection. Such manual operation would be particularly difficult and repugnant where functioning of the machine after application of an upper is fully automated by the use of a program circuit.

To insure effective and safe injection of a shoe sole the mold ring, when its halves are brought together, must be coupled at its sprue with a leak-proof joint to the source of elastomer supply, the parts of the mold ring also requiring accurate alinement along their interface to insure a properly shaped outline for an injected sole.

The objects of this invention are to provide a high speed sole molding machine in which manual operations and adjustments are unnecessary and all essential requirements are met, so that high speed, wholly automatic operations are rendered feasible without requiring withdrawal of a sprue plug manually after each previous operation.

The injection molding machine of the present invention, therefore, has a sole plate mounted on a base, a divided mold ring supported on two-part means movable on the base for separating and bringing the mold ring halves together, the ring halves having injection sprue forming grooves along their interface, and a shoe upper supporting last is provided to complete with the sole plate, a mold cavity, together with mechanisms for separating each half of the mold ring from the other and from the last and sole plate, the cavity being injected by an elastomer plasticizing pump and distributing means between the pump and the sprue in the mold ring, in which machine there also is provided means for releasably coupling each half of the mold ring individually to the distributing means, comprising a block having surfaces on the distributing means and a key on each part of the said ring supporting means to engage the reentrant surfaces and clamp the block on the distributing means individually to each mold ring half about its sprue groove with a secure alining grip, so that the sprue plug on a shoe may be disconnected more effectively from the distributing means simultaneously with the disengagement of the shoe from the mold ring.

These and other features and advantages, as hereinafter described and claimed will readily be apparent from the following detailed specification, taken in connection with the accompanying drawings, in which:

FIG. 4 is a detail view, partly broken away and in section, looking from the right of a set of valves in the distributing manifold, cooling means for the mold ring halves and portions of a shoe on a last after a sole is injected, as taken along the line 4—4 of FIG. 2;

FIG. 5 is a similar view of portions of one mold supporting box and of one of the molds carried thereby, taken along the line 5—5 of FIG. 2; and FIG. 6 is a detail view in left side elevation, partly broken away and in section, of a carrier in the machine for supporting three identical lasts, one of which is shown also in FIG. 4.

The illustrated machine is the same as that disclosed in the present inventors' prior application, above identified, and consists of a high production, automatic shoe sole injecting assemblage of apparatus controlled by a program circuit, the operational cycles of which are continuously capable of adjustment in a manner to take up all of an operator's time without requiring him to wait for completion of any operation or subjecting him to danger of injury from contact with hot shoe parts or escaping highly heated elastomer from misalined mold parts.

Figure 1:
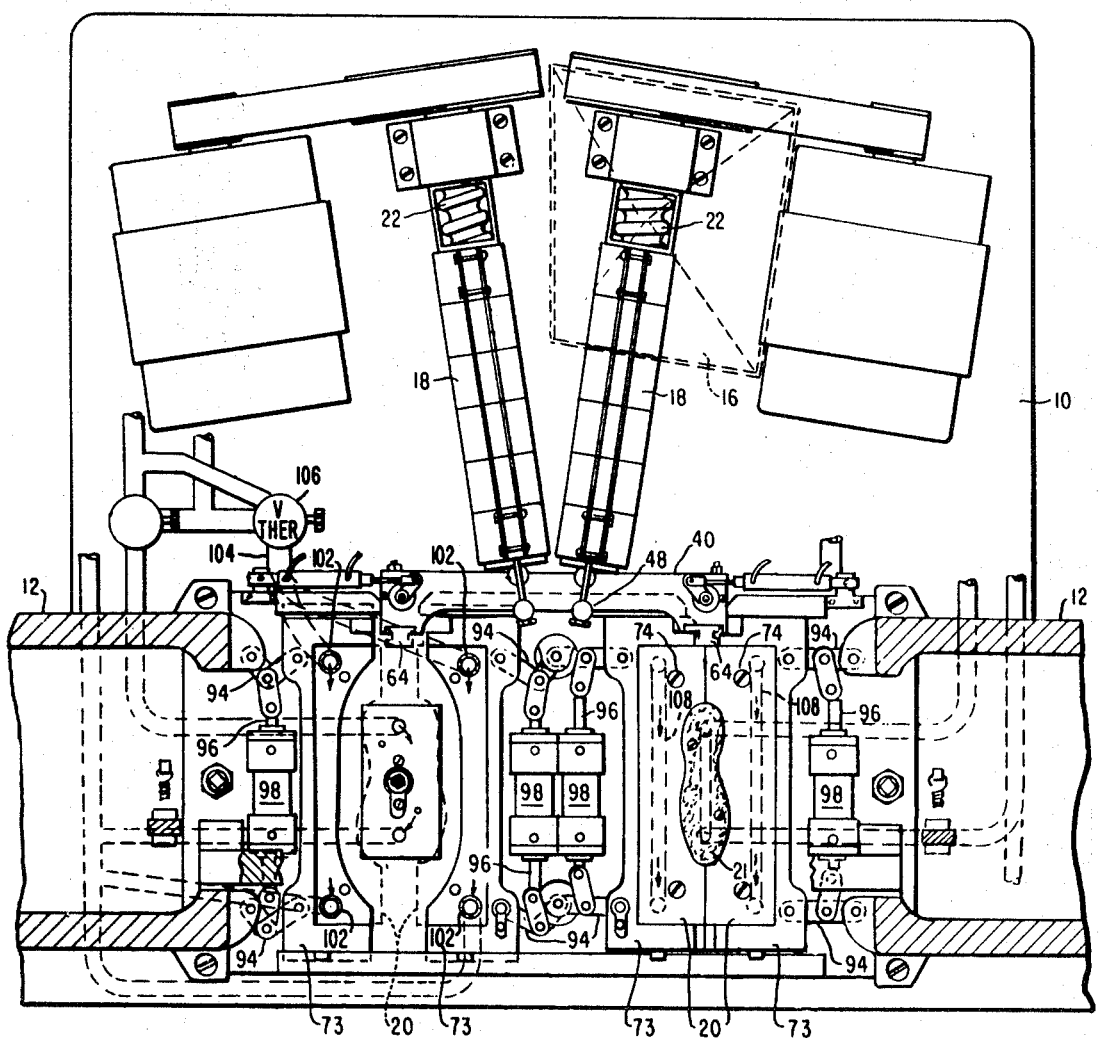
FIG. 1 is a plan view, partly broken away and in section, of a two color, automatic sole injecting machine embodying the features of the present invention.
Figure 2:
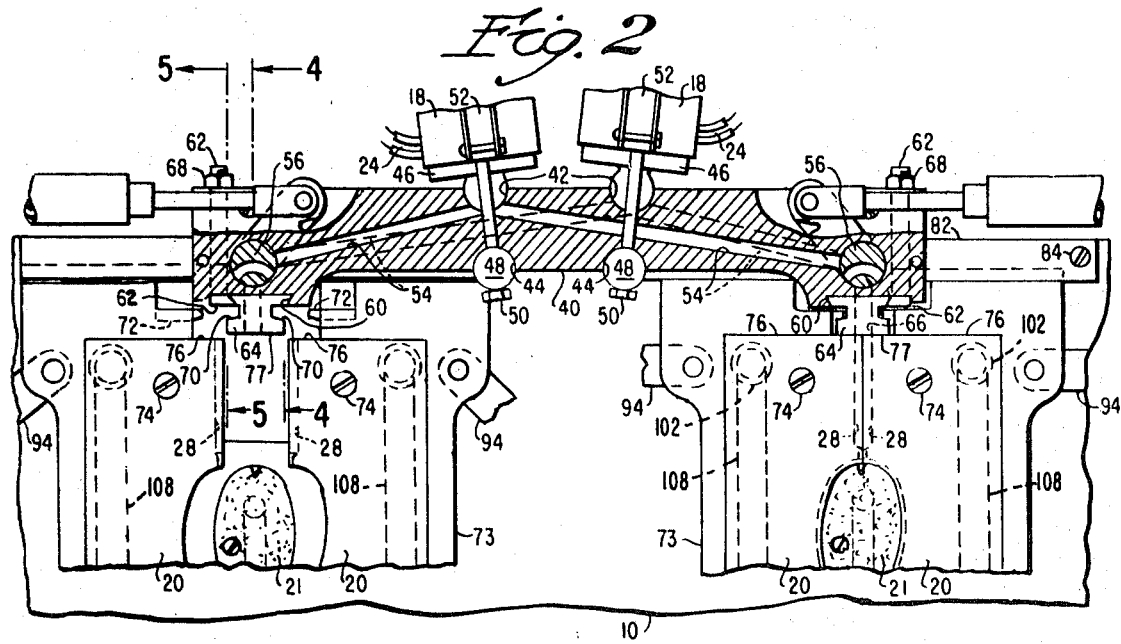
FIG. 2 is a detail plan view on an enlarged scale, partly broken away and in section, of a pair of left and right mold ring halves coupled to a two color elastomer distributing manifold shown in FIG. 1.

Referring to FIGS. 1 and 2 of the drawings, the machine of the invention has a closed base 10, a pair of pedestals 12 at the two sides of the base top, a pair of rotatably mounted last carriers in the form of triangular blocks, one of which is indicated at 14 in FIG. 6, on the pedestals 12, and a pair of hoppers, one of which is shown in dot-dash lines at 16 in FIG. 1 for holding particles of unplasticized elastomer above a pair of elongated and heated plasticizing pressure pumps 18. The pressure pumps are arranged with their outlets converging together and are releasably coupled to two pairs of divided rings, having separable halves 20, which together with a sole plate 21 and a last on the carrier comprise shoe bottoming mold cavities (FIGS. 1 and 2). To plasticize the elastomer particles the pumps utilize rotating worms 22 (FIG. 1) and the exteriors of the pumps are wound with electrical resistance coils having lead-in wires 24 (FIG. 2).

The two molds are spaced laterally from each other adequately to accommodate between them independent actuating mechanisms for supporting and moving the mold halves 20 toward and from each other. Also, there are provided mechanisms for rotating and depressing the last carrier blocks 14 toward the molds and for raising them from the molds wtih completed shoes, the lasts, indicated at 26 (FIG. 6) with uppers 27 thereon cooperating with the mold rings to form bottoming cavities, wherein the elastomer may be forced against a lasted margin of an upper.

After a sole has been molded and cured by cooling, the mechanisms for actuating the mold ring halves, separate them to clear the protruding margin of the soles, so that the completed shoe may be actuated by raising the lasts from the mold cavity with the upper on the last. The different mechanisms thus are timed to act consecutively in the continuously repeated cycles without loss of time as fast as the operator can handle the shoe parts in presenting them to lasts in the machine.

There are three duplicate lasts 26 on each carrier block 14, all three lasts fitting a single mold ring, the lasts on the right carrier block being all rights of the same size and style and the lasts on the left carrier block being all lefts of the same size and style.

The molds are of the type in which the sole edge forming rings are divided at their toe and heel ends to conduct the hot plasticized elastomer into the cavities. Each half along an interface at its heel end has grooves 28 cooperating to form an injection sprue. With previous mold rings of this type it is necessary to insure that any portion of a sprue plug remaining in the machine after a bottoming operation be removed to prevent clogging of the sprue and incomplete closure of the mold ring for a new operation.

The mechanism for rotating each carrier and for depressing it, so that one last at a time will be brought into proper cooperative relationship with the mold ring halves include pneumatic cylinders, one of which is shown at 29 (FIG. 6). One cylinder 29 is mounted on each pedestal 12 with a piston rod extending to a slide 30 mounted on a guideway 32 carried by each pedestal 12. On each slide there is rotatably mounted a shaft 34 keyed to a carrier block 14 and so arranged that when the corresponding piston rod is reciprocated the block will be rotated and reciprocated, raising the slide and lowering it to bring each last successively into and out of a mold ring, as more fully described in the application above identified.

To enable injection of two color soles 36 and 38 (see also FIG. 4) one hopper 16 is filled with an elastomer of a color different from that in the other and a distributing system is provided for releasably coupling each pump 18 to two sprues 28 in each mold ring 20. For this purpose each pump is connected to the central area of the elastomer distribution system comprising an elongated heated manifold 40 (FIG. 2).

The manifold 40 is constructed from a rectangular block of steel with two centrally located curved recesses 42 at the rear and two semicircular channels 44 at the front, as shown in FIG. 2. Into each recess 42 is fitted a curved head of a fixture 46 connected to the discharge end of each pump 18. The fixtures 46 are provided with separate passages from each pump to the manifold. To secure the fixtures 46 to the manifold there are two cylindrical rods 48 disposed in the channels 44 and the rods 48 have openings extending diametrically through them to receive two pairs of bolts 50, each pair passing above and below the manifold and entering threaded openings in blocks 52 secured to the pumps above and below their forward ends. As the bolts 50 are tightened they draw the curved heads into close fitting engagement with the recesses 42 and the cylindrical rods 48 into the channels 44 while stil admitting slight rotary movement of the heads and recesses without danger of breakage or leakage of the distributing system as expansion and contraction of the distributing connections and the pumps occur under conditions of rapid heating and cooling.

At its outer ends the manifold 40 has four valves, two at each end and one above another for controlling the flow of elastomer through ducts 54 running from each pump toward both ends of the manifold. The manifolds are heated electrically to maintain the elastomer in proper plasticized condition and the valves comprise two pairs of valve bodies 56 projecting from each bore, one upwardly and one downwardly from that bore of the manifold and serving to shut off the outer ends of the ducts. Thus, the construction of the manifold and the arrangement of the pumps and mold rings enables the distance traversed by the elastomer from each pump to either mold ring to be substantially the same, enabling equal temperatures to be maintained easily as the elastomer flows into the cavities.

To receive the flow of elastomer from each valve into a mold ring the manifold is provided at each end with two openings 58 (FIG. 4), one alined with each valve body when turned to open position, the passage through each valve body forming a right angle. The valve bodies 56 are located one above the other at each end of the manifold and the openings 58 intersect the forward side of the manifold within dovetail grooves formed between ribs 60 on the manifold (see FIG. 2) and the beveled heads of bolts 62 passing through openings at the ends of the manifold.

To releasably couple each end of the distributing manifold 40 to a mold ring, so that it may be connected and disconnected quickly, according to the present invention, there is fitted within each doevtail groove 60, 62 a dovetail shaped side of a separate coupling block 64 in the form of a letter H. Each H-block has two perforations 66 (FIG. 4) alined with the openings 58 in the manifold. To secure the H-blocks in place the bolts 62 have nuts 68 at their rearward threaded ends which act when tightened to draw the H-blocks tightly against the manifold.

To insure leak proof coupling of the mold rings 20 against the H-blocks 64 there are formed slightly beveled reentrant surfaces 70 (left of FIG. 2) along the inner sides on the forward flanges of each H-block 64, which surfaces act as wedges when engaged by a pair of oppositely disposed coupling keys 72 (see also FIGS. 3 and 5) projecting towards each other from parts 73 of a two part mold ring supporting box. Each part 73 of the mold ring supporting box consists of a flat bottom, upstanding ends and a side, slidably mounted for relative movement with respect to another similar matching box part transversely along the main base 10 on the machine. Each mold ring half 20 is clamped for quick change to its respective supporting box part 73 by screws 74 (also FIG. 2) so as to be moved in unison with its box part. Each key 72 is attached to its supporting box part 73 within a notch in its rearward end by a pair of screws 75 (FIG. 5) passing loosely through the box part and into threaded engagement with the key.

As the keys 72 wedge against each bevel 70 on an H-block the mold supporting boxes with their mold ring halves 20 are forced rearwardly until flat surfaces 76 on the mold ring halves are pressed securely against forward flat faces 77 (FIG. 2) on the H-blocks, clamping the mold ring halves into sealing alinement with each other about the sprues 28, 28 and orienting the mold ring halves individually to right angle positions with relation to the faces 77. Such orientation is possible because of the manner of mounting and actuating the mold ring supporting boxes, as will be described.

Figure 3:
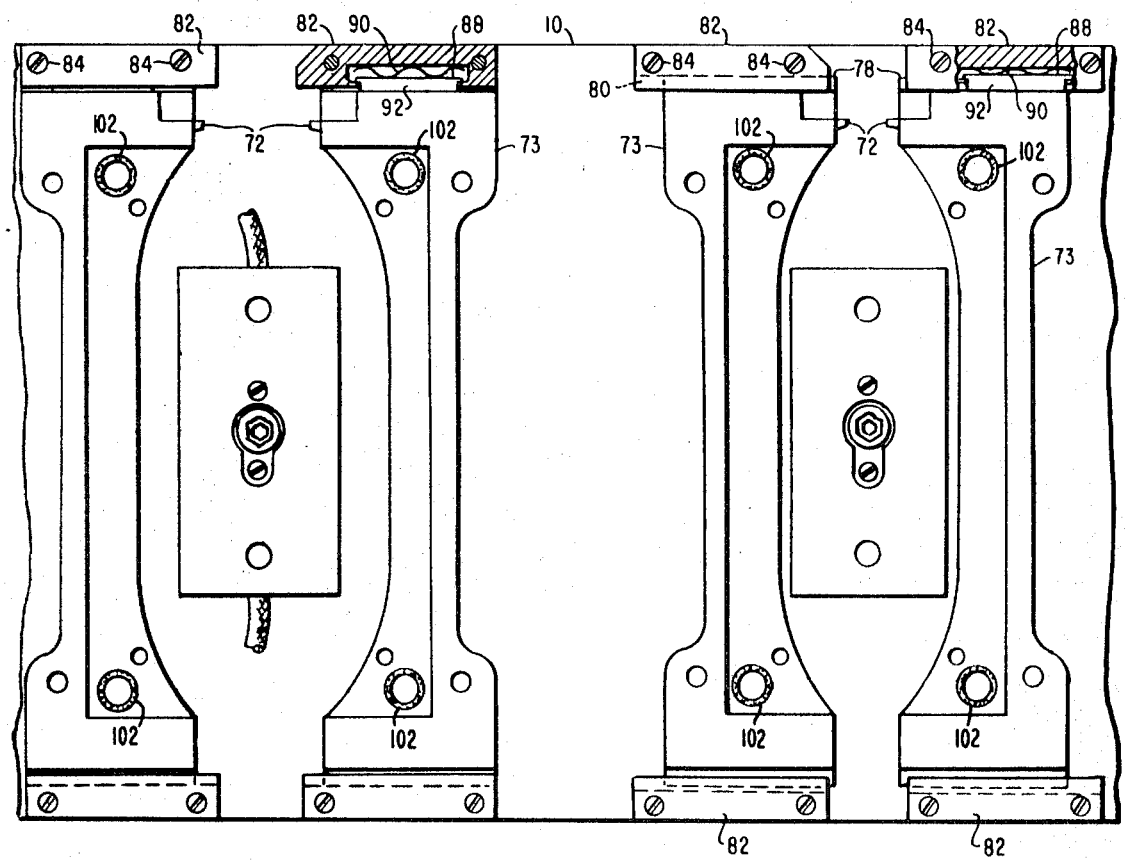
FIG. 3 is a further sectional detail view of a pair of two part mold ring supporting boxes shown in FIG. 2.

The mounting for the mold ring boxes comprises two rectangular tongues 78 on each box part 73 (see FIGS. 3 and 5) fitting loosely within horizontal grooves 80 in blocks 82 forming guideways secured to the base 10 (FIG. 5) by screws 84 (see also FIG. 3). The guideways 82 are so spaced from each other in a forward and rearward direction that there is limited transverse movement relatively to the lengths of the guideways for the parts 73 of the mold supporting boxes. By mounting the mold boxes in this way it is possible for the box parts to be shifted relatively to each other a sufficient amount to centralize the mold ring halves in positions with the inner cavity surfaces at each side of the joints in the rings at their interface, thus insuring a smooth alined internal contour for the cavities. When the mold box parts 73 are moved toward each other from the left hand positions of FIG. 2 to the right hand positions of that figure the keys 72 on the mold box parts engage and wedge against the bevel surfaces 70 on the H-blocks. In so doing the pair of injecting sprues formed by grooves 28 at the interface of the mold halves are also sealed individually to the perforations 66 of the H-blocks to enable leak proof injection of the mold cavities. Thus, when the mold ring halves 20 are brought together the sprues 28, 28 are closed and simultaneously the ring halves are sealed in engagement with the perforations 66 of each H-block.

A particular advantage of the releasable coupling means for the mold rings, above described, is apparent during removal of each completed shoe from a mold. When the mold ring halves 20 are being separated for release of shoe soles 36, 38 the sealing engagement between the mold ring halves and the H-blocks on the manifold is first broken by forward movement transversely of the guideways of the mold ring while still embracing the hot molded soles, together with plugs 86 (see FIG. 6) of partially solidified elastomer within the sprue grooves 28. Forward movement of the sprue plugs 86 within the grooves 28 before a shoe is raised tends to disconnect the plugs from within the perforations 66 in the H-blocks, or at least weaken the bond of the elastomer at the joints between the H-blocks 64 and the heated manifold openings 58. Since the elastomer at the points of exit from the manifold is highly heated also, it has little tensile strength and the valves 56 act as gates to cut the sprue plugs 86 before each shoe is raised after the mold ring halves are separated, the sprue plugs integrally formed with each newly injected shoe sole being easily released for withdrawal from the perforations 66 in the H-blocks 64, as shown in FIG. 6, while still attached to the shoe, all of these functions being accomplished after as the mold ring halves are separated.

To enable the mold ring halves 20 to be centralized transversely between the guide blocks 82 before being clamped and while being brought together in preparation for a new operation, each block has a lipped cut out area 88 (see FIG. 3) above the tongue 78. Within the cut out areas 88 are confined wavy leaf springs 90 resting on the tongues to force gibs 92 also resting on the tongues yieldingly into contact with each mold box half 73. Each gib has ribs at its ends engaging the lips in the cut out areas 88 within the guide blocks 82 to retain the gibs from displacement from the blocks 82, as shown at the left side at FIG. 3.

As the mold rings start to be opened up to release a molded shoe sole the springs 90 break the seals between the mold ring halves and the H-blocks 64 and between the sprue plugs 86 and the perforations 66, pressing the mold ring halves forwardly between the guide blocks, so that excessive transverse displacement of the mold halves with relation to each other is avoided until the halves are moved away from the blocks 64.

To actuate each pair of mold ring halves 20 toward and from each other, mechanisms are provided, including four sets of toggle links 94 connected to each mold ring supporting box part 73, as shown in FIG. 1. The middle joint in each set of toggle links is connected to one end of a double ended piston rod 96 in a cylinder 98 to cause each end of a mold ring half to be moved in unison with the other end. As the separating movement of each pair of mold ring halves is completed, the links of the toggles, which are of different length in each set, cause the separated halves to be drawn more positively to the forward limits of their movements. For this reason also the sprue plugs are more fully separated from within the heated H-blocks 64 on the manifold rather than from the shoe itself, so that when a completed shoe is raised from a mold it carries with it the plugs 86 (FIG. 6). Thus, there is no necessity for an operator of the machine to reach into a congested and highly heated area of the mold to clear it of a sprue plug or broken parts thereof before starting a new operation, as more fully disclosed in the prior application, above identified.

As a means for further offsetting any difficulty from minor irregularities in the construction of the mold rings to such an extent as will impede the flow of elastomer by reason of misalinement in the sprue grooves 28 with the perforations 66 in the H-blocks, the grooves 28 forming the sprues are made sufficiently large in diameter that even with moderate misalinement no interruption of elastomer flow will occur. With grooves sufficiently large for this purpose it is desirable to avoid sudden filling of each sole cavity by providing a restriction 100 at each outlet end of the grooves 28 (see FIG. 4). The restrictions 100 not only prevent sudden filling of the sole cavities but also assist in distributing the elastomer as it first begins to fill each cavity by breaking up the elastomer into finely divided streams and partially cooled droplets which congeal more readily than a large solid mass of elastomer. Thus, the restrictions act, not only to provide points of weakness in the sprue plugs, enabling them to be broken easily close to the heel end of a shoe, as more fully explained in the prior application, but also to assist in preventing undesired leakage of the molds at other joints by increasing the hardening action while filling the cavities.

To control directly the temperature and pressure of the elastomer while filling the mold cavities without complicating the problem of quickly changing one set of mold halves for another each mold ring supporting box part 73 has a pair of heat absorbing fluid conducting fixtures 102 at its ends. The fluid conducting fixtures 102 are connected by flexible piping 104 (FIG. 4) extending from an adjustable thermostat 106 (FIG. 1) to regulate the flow of fluid from a refrigerating unit (not shown). The mold ring halves have direct cooling passages 108 (FIG. 2), the inlets and outlets of which are alined with the fixtures 102 when the mold ring halves are clamped in place on the supporting boxes by screws 54. The cooling fluid is thus supplied directly to the mold rings halves, insuring rapid heat transfer and adequate cooling and hardening of the sprue plugs 86 after each molding operation, so that they have sufficient strength to enable them to be held securely in place on the shoes when they are withdrawn from the mold cavities. In this way no difficulty is encountered from loose sprue plugs falling between the separated mold ring halves or between the supporting box parts, so that they may be closed tightly together for each succeeding bottoming operation.

The nature and scope of the invention having been indicated, and a particular embodiment having been described, what is claimed is:

1. A high production machine for making shoes by injection molding, comprising
   a base,
   a sole plate on the base,
   a divided mold ring,
   two part supporting means for the mold rings halves and
   a loose guideway along which the parts of the supporting means are movable relatively to each other and transversely of the guideway on the base,
   the mold ring halves being movable with the parts of the supporting means and having along an interface grooves which when brought together form an injection sprue,
   a last cooperating with the mold ring and sole plate to form a bottoming cavity for injection of plasticized elastomer against a lasted margin of an upper on the last,
   mechanism for actuating parts of the mold ring supporting means with relation to one another, to the sole plate and to the last to separate and to bring together the mold ring halves and to raise and lower the last from and to cooperative relation with the mold ring,
   a heated plasticizing pump for forcing hot elastomer through the sprue into the cavity and
   elastomer distributing means between the pump and the sprue in the mold ring, in combination with
   means for releasably coupling each half of the mold ring to the distributing means, comprising
   a perforated block having reentrant surfaces on the distributing means and
   a key on each part of the mold ring supporting means engaging the reentrant surfaces on the block when the mold ring halves are being brought together to seal the sprue to a perforation in the block and disengaging the reentrant surfaces when the mold ring halves are being separated to tend to disconnect the sprue plug from the distributing means.

2. A high production machine for making shoes, as in claim 1, in which the distributing means comprises a heated manifold for controlling the flow of elastomer into the sprue and the coupling block is H-shaped with its reentrant surfaces beveled for wedging engagement by the keys as the parts of the ring supporting means are moved toward each other.

3. A high production machine for making shoes, as in claim 2, in which
   The guideway for the mold ring supporting means consists of two loosely fitting guide blocks and there is provided
   a spring between the supporting means and one of the guide blocks to break the sealing engagement between the mold ring halves and the H-shaped block.

4. A high production machine for making shoes, as in claim 2, in which there are provided two divided mold rings, and a two-part supporting means for the mold rings and the distributing manifold is elongated and connected at each of its ends to a separate coupling block and at its central portion to the plasticizing pump, the distance traversed by the elastomer from the pump to either mold ring being substantially the same to assure equal temperatures to be maintained in the elastomer injected into the cavity.

5. A high production machine for making shoes, as in claim 2, in which there is provided a curved fixture on the plasticizing pump and a centrally located recess in the manifold within which the fixture is secured to admit slight rotary movement of the pump with respect to the manifold without breakage or leakage under conditions of extreme heating and cooling.

6. A high production machine for making shoes, as in claim 1, in which there are provided
   two sets of sole plates, mold rings, lasts and carriers, one set being constructed for right shoes and the other for left shoes,
   an injection sprue at the heel end of each mold ring, and
   a source of pressurized and heated elastomer in the form of an elongated pump extending toward the mold rings for injecting elastomer into the sprue of each, and
   in which the distributing means comprises an elongated heated manifold connected at its central portion with the delivery end of the pump and at the manifold ends with the sprues in the mold rings, and
   a valve in the manifold at each end to cut off the flow of elastomer from the pump to either mold ring.

7. A high production machine for making shoes, as in claim 6, in which there are provided
   a second elastomer pump,
   a second sprue at the heel end of each mold ring, and
   a second valve at each end of the manifold to cut off the flow of elastomer from either pump to either sprue in each mold ring.

8. A high production machine for making shoes, as in claim 7, in which
   the valves at each end of the manifold comprise a single bore in the manifold and
   two valve bodies project from each bore, one upwardly and one downwardly from the manifold.

9. A high production machine, as in claim 7, in which the manifold has two ducts, one above the other and each duct connects a pump with a valve bore at either end of the manifold.

10. A high production machine for making shoes, as in claim 1, in which
    the divided mold ring supporting means have heat absorbing fluid conducting fixtures alined with direct cooling passages in the ring halves and
    means are provided for clamping the supporting means parts individually to the ring halves with the passages in line with the fixtures to enable quick change of the mold ring halves.

References Cited

UNITED STATES PATENTS

| | | | |
|---|---|---|---|
| 3,110,061 | 11/1963 | Hardy | 18—30(US) |
| 3,358,333 | 12/1967 | Kitchener et al. | 18—30(US) |
| 3,400,429 | 9/1968 | Ludwig | 18—34(J)X |
| 3,467,985 | 9/1969 | Wessel | 18—30(US) |

FOREIGN PATENTS

| | | | |
|---|---|---|---|
| 147,933 | 4/1950 | Australia | 18—34(S) |

J. SPENCER OVERHOLSER, Primary Examiner

M. O. SUTTON, Assistant Examiner

U.S. Cl. X.R.

18—42H